United States Patent [19]

Howlett et al.

[11] 4,447,750

[45] May 8, 1984

[54] ELECTROMAGNETIC DEVICE CONSTRUCTION

[75] Inventors: James F. Howlett, Radford; Marlin H. Thompson, Boones Mill, both of Va.

[73] Assignee: International Scientific Industries, Inc., Christianburg, Va.

[21] Appl. No.: 391,464

[22] Filed: Jun. 23, 1982

[51] Int. Cl.$^3$ .................................................. H02K 5/00
[52] U.S. Cl. .................................... 310/89; 310/42; 403/326
[58] Field of Search ................ 310/42, 268, 89, 91, 310/90, 258; 403/326

[56] References Cited

U.S. PATENT DOCUMENTS

| | | | |
|---|---|---|---|
| 2,317,889 | 4/1943 | Danneman | 403/326 |
| 2,417,195 | 3/1947 | Hargreaves | 310/89 UX |
| 2,804,559 | 8/1957 | Brewer | 310/89 |
| 3,398,306 | 8/1968 | Merrick | 310/42 |
| 3,705,459 | 12/1972 | Biddison | 310/207 |
| 3,916,231 | 10/1975 | Cathey | 310/89 |
| 3,922,574 | 11/1975 | Whiteley | 310/268 |
| 4,007,387 | 2/1977 | Rustecki | 310/42 |
| 4,081,726 | 3/1978 | Brimer | 310/166 |
| 4,243,902 | 1/1981 | Ban | 310/154 |
| 4,281,601 | 8/1981 | Overman | 403/326 |

FOREIGN PATENT DOCUMENTS

| | | | |
|---|---|---|---|
| 424244 | 1/1926 | Fed. Rep. of Germany | 310/42 |
| 1173177 | 7/1964 | Fed. Rep. of Germany | 310/89 |

Primary Examiner—R. Skudy
Attorney, Agent, or Firm—Stevens, Davis, Miller & Mosher

[57] ABSTRACT

Disclosed is a unique electromagnetic device, e.g. motor, construction in which a cylindrical tubular casing contains a stator assembly, a rotor assembly and bearings. The rotor assembly is supported by the bearings within the tubular casing which are in turn supported by a pair of end bells provided at each axial end of the tubular housing to close the same. Each axial end of the tubular housing contains, on an inner periphery thereof, an annular groove, at least one of the annular grooves having a tapered side wall at that side wall closest to an end of the housing such that the width of the associated groove progressively decreases along its depth. Each of the end bells contains a groove on an outer peripheral surface thereof which fits within the tubular housing, the outer peripheral grooves of the end bells substantially aligning with the interior peripheral grooves of the tubular housing. A pair of C-clips is provided in the opposing grooves at each end of the tubular housing with at least the C-clip provided in the groove with the tapered side wall having a complementary taper so that upon radial expansion of the latter C-clip, an axial force is generated tending to bias the two end bells together to axially clamp and hold together the stator assembly, bearings and rotor assembly.

8 Claims, 10 Drawing Figures

ELECTROMAGNETIC DEVICE CONSTRUCTION

BACKGROUND AND SUMMARY OF THE INVENTION

The present invention relates to a unique electromagnetic device construction in which rotor, stator and ball bearing assemblies thereof can be easily assembled and held together with a high degree of accuracy and with no substantial "play".

Various electromagnetic devices are known in which the internal elements thereof are held together by various fastening devices such as screws, bolts, clips, etc. The fastening devices used to hold the elements together generally add considerable cost and weight to the device and are subject to loosening by vibration during operation. Any loosening of internal elements may cause further vibrations of the device and lead to an increase in friction and heat dissipation.

In addition, the numerous fasteners which are required to hold the various elements together result in a complicated assembly operation thus further adding to overall cost.

The present invention was conceived to provide a unique electromagnetic device in which the various internal elements thereof are easily assembled and reliably held together for as long as required.

An additional object of the invention is the provision of an electromagnetic device in which all slack between the various elements within a housing is taken up to provide a so called "dead stack" thereby avoiding any end play or backlash.

An additional object of the invention is the provision of an electromagnetic device which has a high volumetric efficiency in that external bolts which typically run axially of the device are avoided, thus avoiding the extra casing thickness normally required to house such bolts.

An additional object of the invention is the provision of an electromagnetic device which provides an easy assembly with minimal requirements for assembly precision.

The above and other objects, features and advantages of the invention will be more readily perceived from the following detailed description which is provided in connection with the accompanying drawings.

DETAILED DESCRIPTION OF THE INVENTION

Figure 1A:
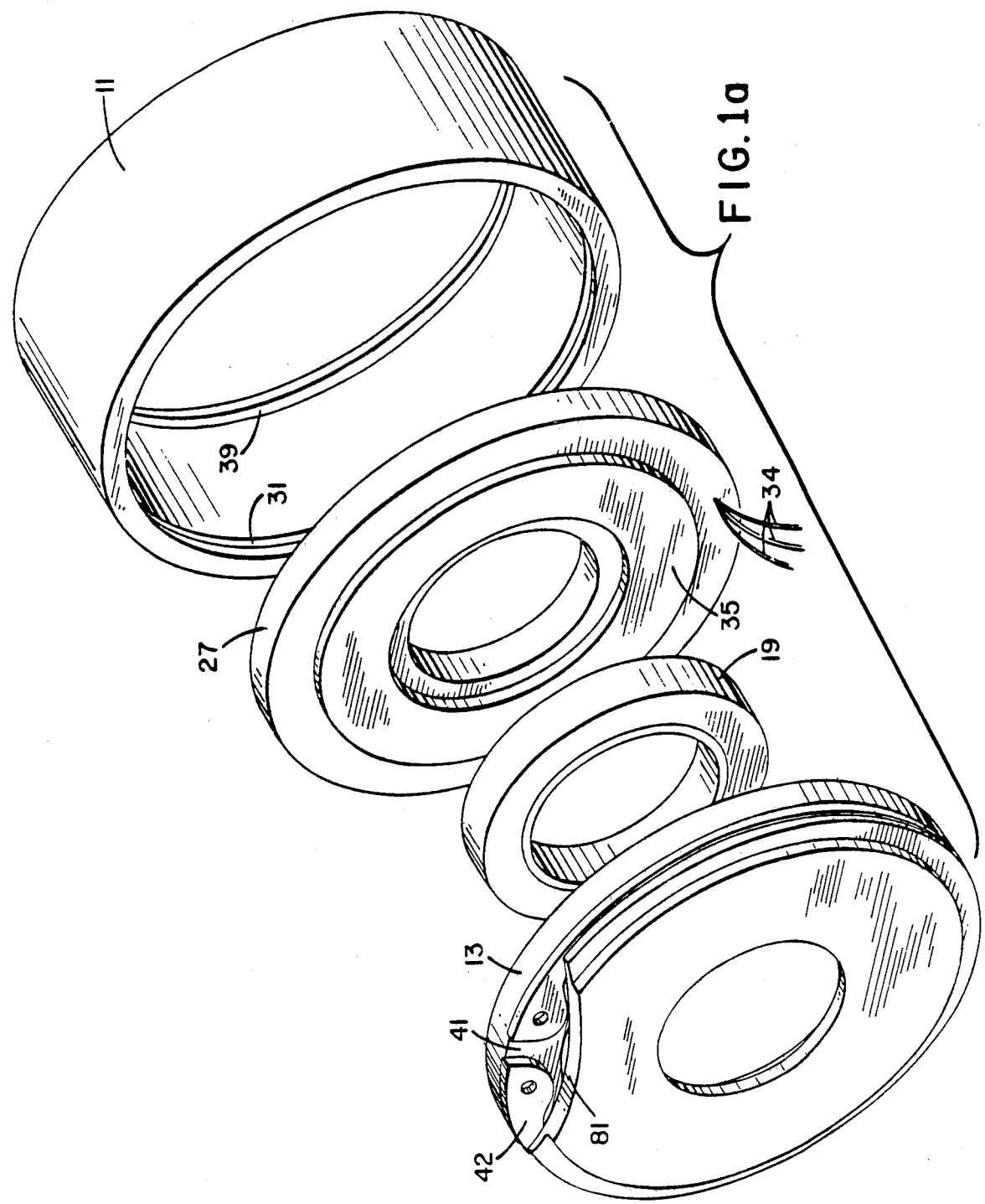
FIGS. 1a and 1b, taken together, illustrate an axially-separated first embodiment of the invention.
Figure 1B:
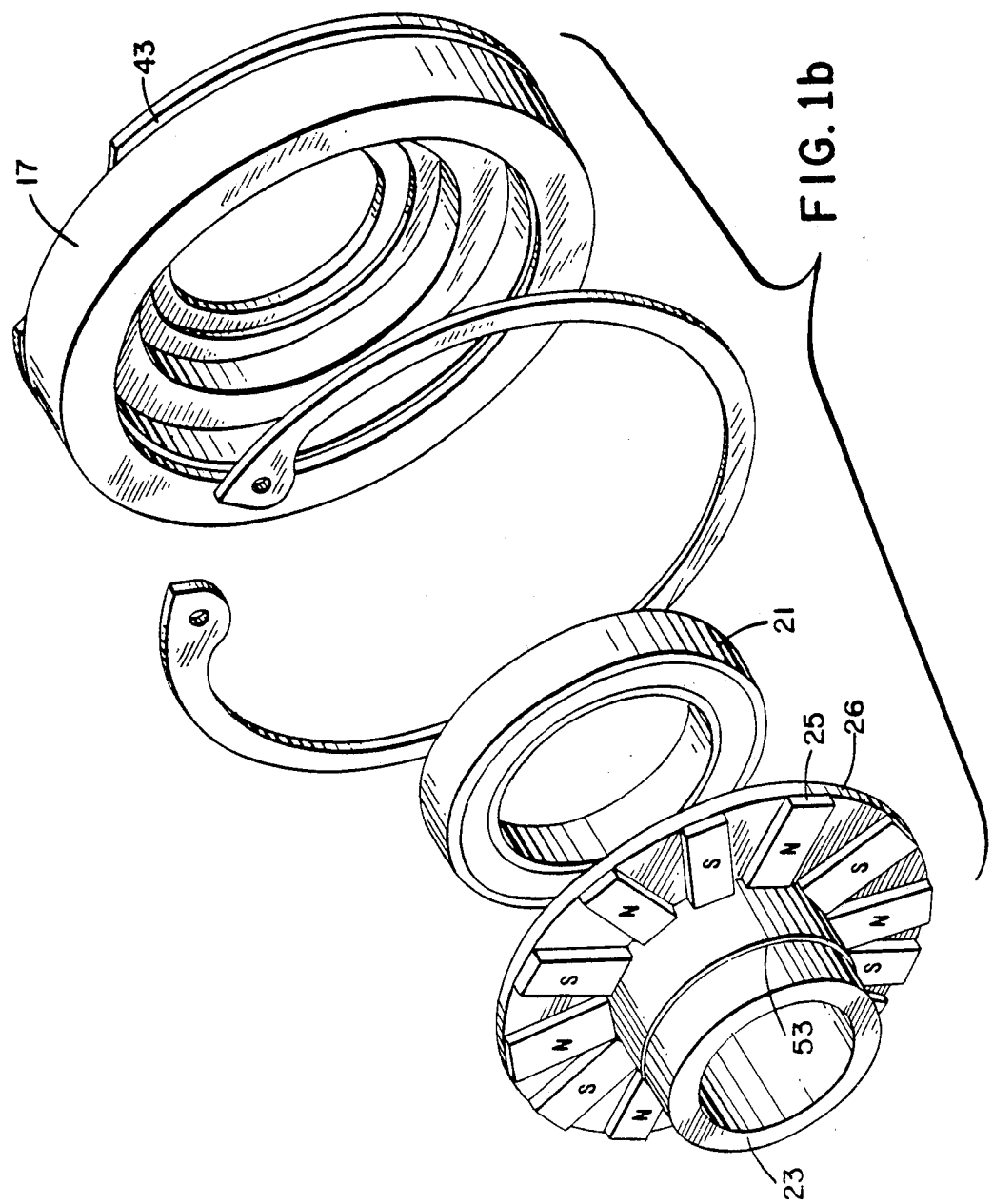

FIGS. 1a and 1b illustrate the component parts of a first embodiment of a motor constructed in accordance with the teachings of the invention. Although the ensuing description is of a motor, it should be appreciated that the structures described could also be used, as well known, to produce an electrical current generator. In addition, although specific structures are shown for a 3-phase, 12 pole motor, the teachings of the invention are also applicable to other motor configurations.

Figure 2:
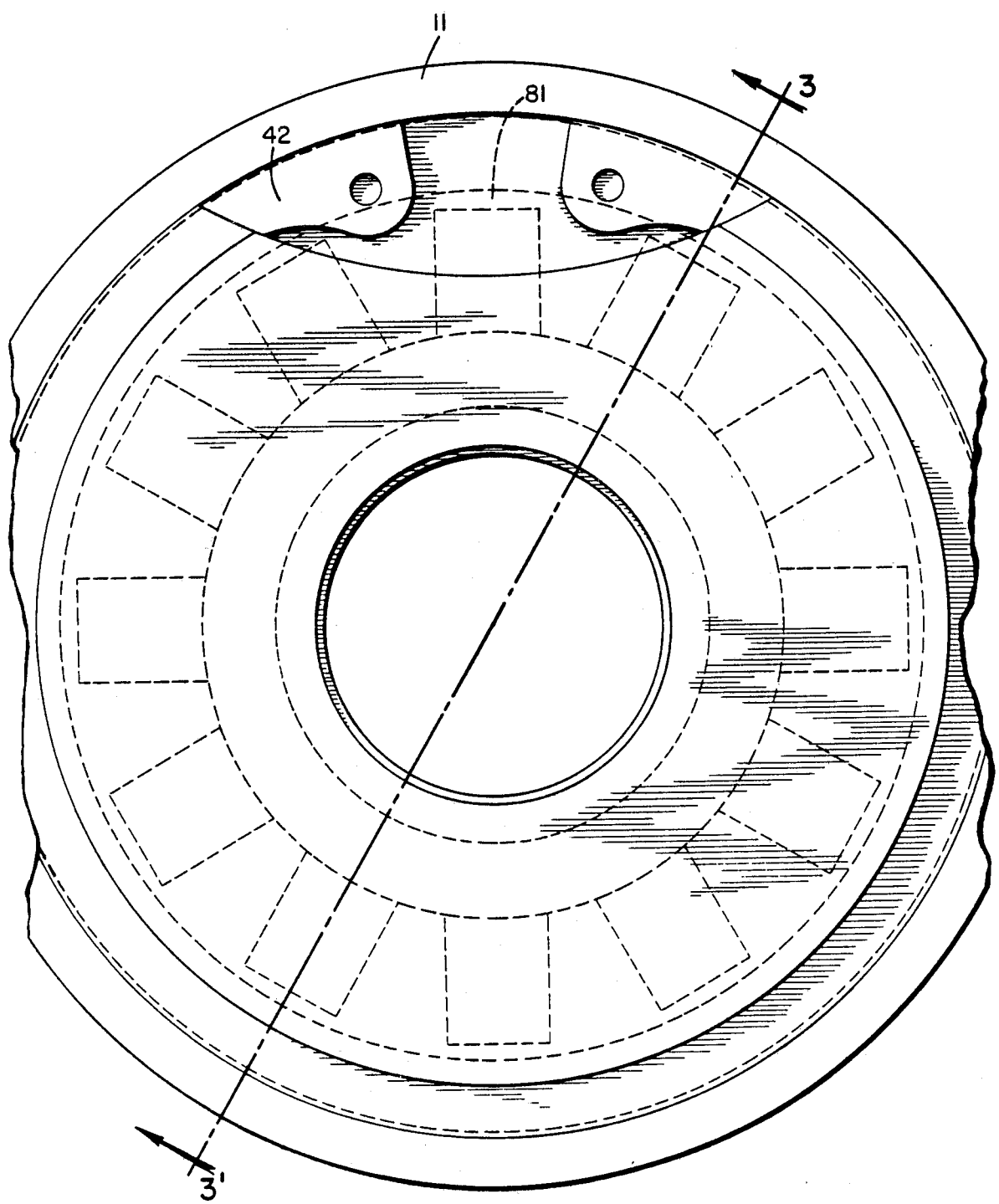
FIG. 2 illustrates an end view of the first embodiment of the invention.
Figure 3:
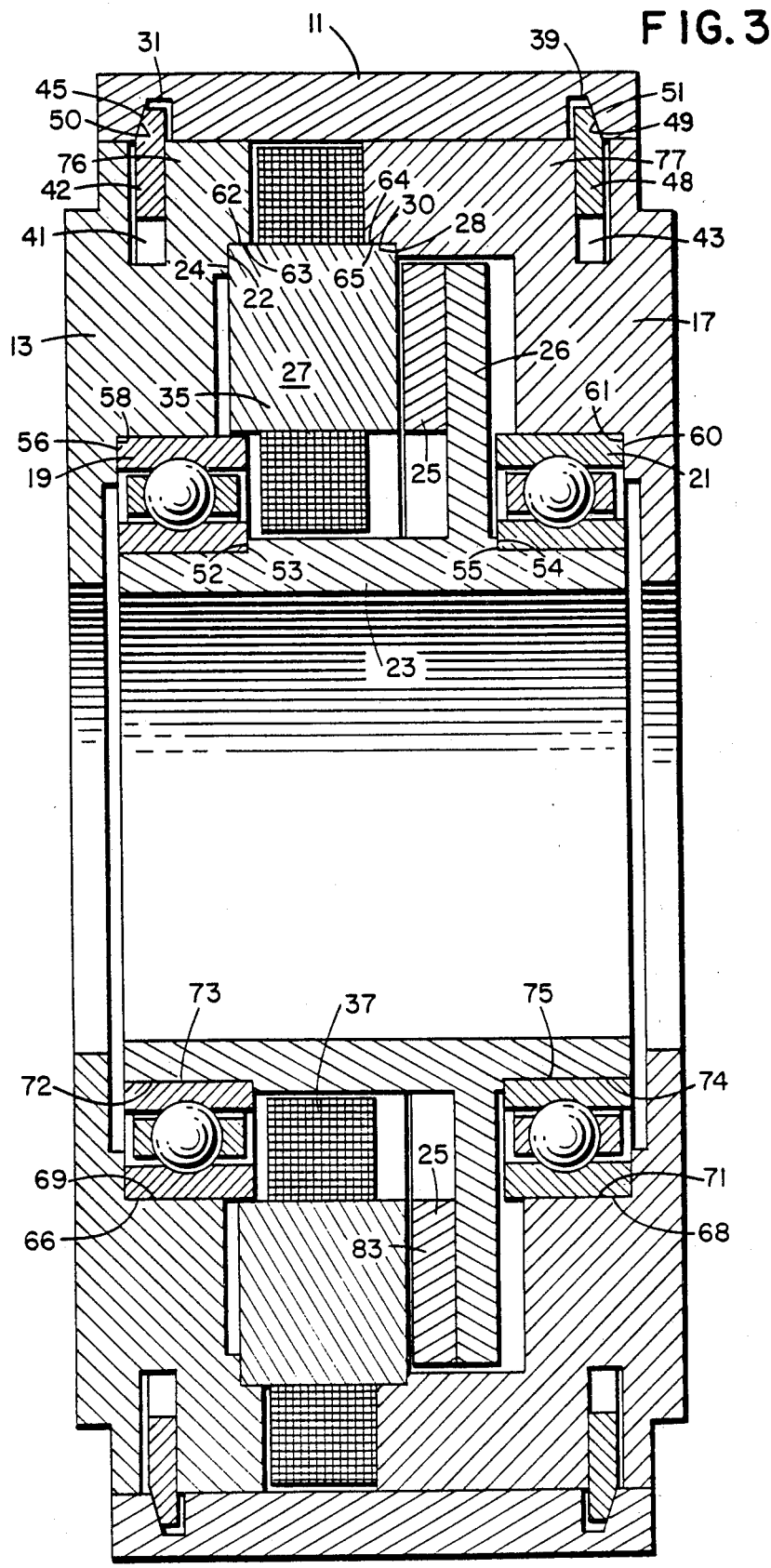
FIG. 3 illustrates a sectional view along the line 3—3' of FIG. 2.

A round tubular housing 11 is shown which defines the exterior periphery of the motor assembly. Mounted within tubular housing 11 is a disc-shaped magnetic flux conducting rotor 26 which is connected to a rotor shaft 23. Although rotor shaft 23 is shown as having an axial cylindrical bore therein, it may also be constructed as a solid shaft. Shaft 23 has on its outer peripheral surface circumferential shoulders 53 and 55 (FIG. 3). A plurality of magnetic field producing elements is mounted on a side surface of disc-shaped rotor 26. The magnetic field producing elements are preferably permanent magnets 25 arranged so that successive magnets provide an alternating North and South pole at a side surface of the rotor (FIG. 1b). For a twelve pole motor, twelve magnets are used (FIG. 2). The permanent magnets 25 are annularly and equally spaced on a side surface of the disc-shaped rotor 26 to define the various poles of the motor.

The disc-shaped rotor 26 is rotatably supported by each of two end bells 13 and 17, which close opposite axial ends of the tubular housing 11, through respective roller bearings 19 and 21, as more clearly seen in FIG. 3. A stator assembly 27 is also mounted within tubular housing 11 in close proximity to the disc-shaped rotor 26. The stator assembly, which is also held by end bells 13 and 17, will be more fully described below.

A pair of grooves 31,39, each having opposing sidewalls and a bottom wall, is provided at opposite axial ends and on the interior peripheral surface of tubular housing 11 (FIGS. 1a, 3) and each of the end bells 13 and 17 contains respective opposing grooves 41 and 43 (FIGS. 1a, 3).

As best illustrated in FIGS. 1a, 1b and 3, the motor structures above described are sequentially assembled within tubular housing 11 with the end bells 13 and 17 having respective annular faces 24 and 28 located in planes perpendicular to the central axis of tubular housing 11 and respective interior peripheral faces 62, 64 which are coaxial with the axis of tubular housing 11. Interior faces 62 and 64 engage with respective faces 63 and 65 provided on the outer periphery of stator assembly 27, while the end bell faces 24 and 28 engage with respective stator assembly faces 22 and 30, to hold the stator assembly axially and radially in place within tubular housing 11.

The end bells 13 and 17 also respectively include additional annular faces 56 and 60 also residing in respective planes perpendicular to the axis of tubular housing 11 and respective peripheral faces 66 and 68 which are coaxial with the axis of tubular housing 11. Annular faces 56 and 60 engage with respective annular faces 58 and 61 of roller bearings 19 and 21 while peripheral faces 66 and 68 engage with respective outer peripheral faces 69 and 71 of the roller bearings. In this manner the end bells 13 and 17 axially and radially position and hold roller bearings 19 and 21 within tubular housing 11.

The roller bearings 19 and 21 abut at respective sides 52 and 54 with annular shoulders 53 and 55 provided on the exterior periphery of rotor shaft 23. The roller bearings also have respective inner peripheral surfaces 72 and 74 which abut respective exterior peripheral surfaces 73 and 75 of rotor shaft 23. Thus, the end bells 13 and 17 also hold, through respective roller bearings 19 and 21, the rotor shaft 23 and rotor 26 in position within tubular housing 11.

The grooves 31 and 39 provided on the inner periphery of tubular housing 11 are each provided with respective tapered side walls 45 and 51 which are the sidewalls closest to the respective ends of tubular housing 11. The side walls 45 and 51 are tapered such that the width of each of the grooves 31 and 39 progressively decreases along its depth.

In order to hold end bells 13 and 17 in position each is provided with a respective outer peripheral portion 76 and 77 which fit within the inner periphery of tubular housing 11. The outer peripheral portions are provided with respective grooves 41 and 43 for the two end bells, which oppose and align with respective grooves 31 and 39 of the tubular housing 11. Each pair of opposing grooves (31,41) and (39,43) has mounted therein a C-clip (42 and 48) of conventional construction, except that each C-clip has a respective tapered side face 50 and 49 which is complementary to the tapered side wall 45 and 51 provided at the respective grooves 31 and 39. The complementary tapering surfaces of the grooves 31 and 39 and the tapered faces 50 and 49 of the C-clips 42 and 48 engage one another upon radial expansion of the C-clips to provide oppositely directed axial forces which bias the end bells 13 and 17 toward one another, that is, inwardly along the axis of tubular housing 11. This biasing presses the end bells into engagement with the stator assembly 27 to hold it in position within tubular housing 11. The end bells 13,17 also axially press against respective bearings 19,21 which in turn axially press against the shoulders 53 and 55 provided at the rotor shaft 23 to thereby hold the roller bearings and rotor shaft in fixed position within tubular housing 11.

Because of the inwardly directed axial force produced by the tapering surfaces provided at the grooves 31 and 39 and C-clips 42 and 48 the end bells 13,17 and all structures therebetween are axially clamped together with a sufficient force to take up any "play" of the components to thus provide a high degree of affixation of the motor parts within tubular housing 11. Although each of grooves 31, 39 is shown as having a tapered side wall, the axial clamping of the motor structure can be achieved to a considerable degree if only one such tapered side wall is provided at one of the grooves 31, 39 and a complementary tapered surface engaging therewith is provided at the associated C-clip. The other groove and its associated C-clip would then have a non-tapered construction.

The end bells 13 and 17 each have a cut-out portion 81 (FIGS. 1, 2) which allows access to the terminal ends of C-clips 42 and 48 for disassembly of the motor.

The stator assembly 27, which forms the motor armature, comprises an annular coil array which is encased in a synthetic resin, the latter providing the overall smooth exterior shape for coils of the stator assembly illustrated, for example, in FIGS. 1a and 3. A set of three phase wires 34 is shown as emerging from the stator assembly in FIG. 1a.

Figure 6:
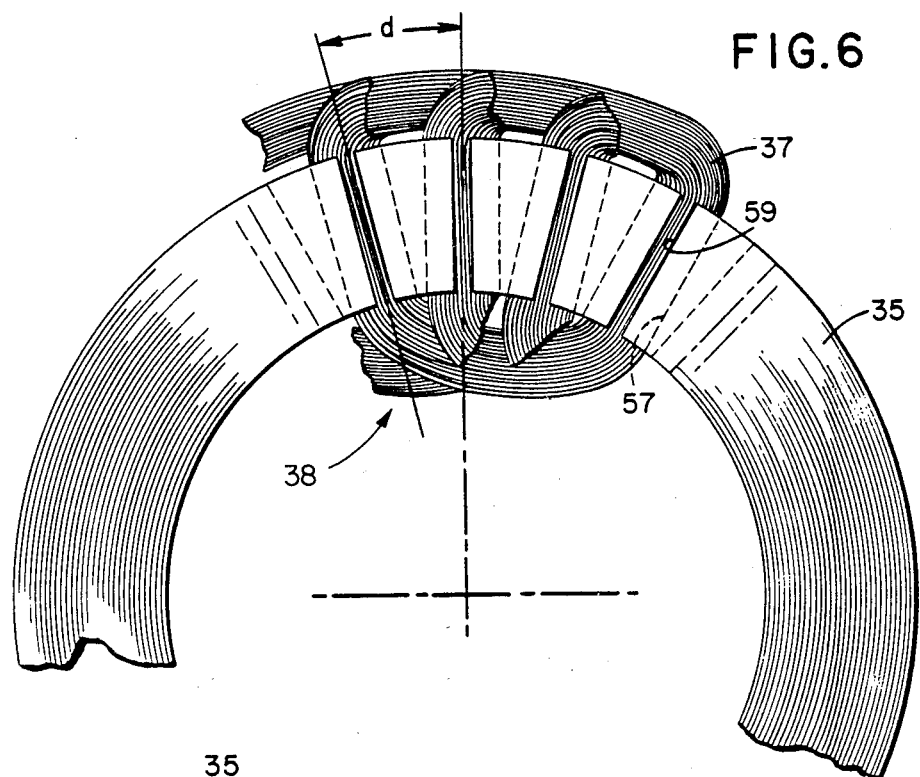
FIG. 6 illustrates in side view a portion of the stator winding shown in FIG. 3.
Figure 8:
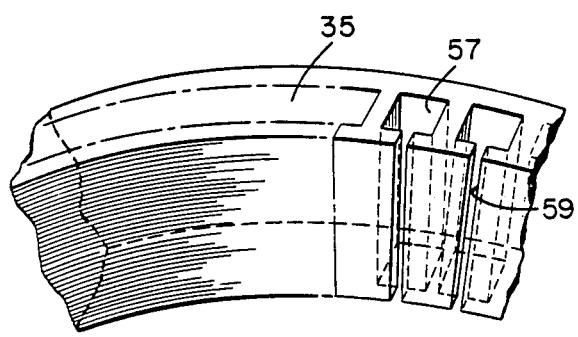
Figure 7:
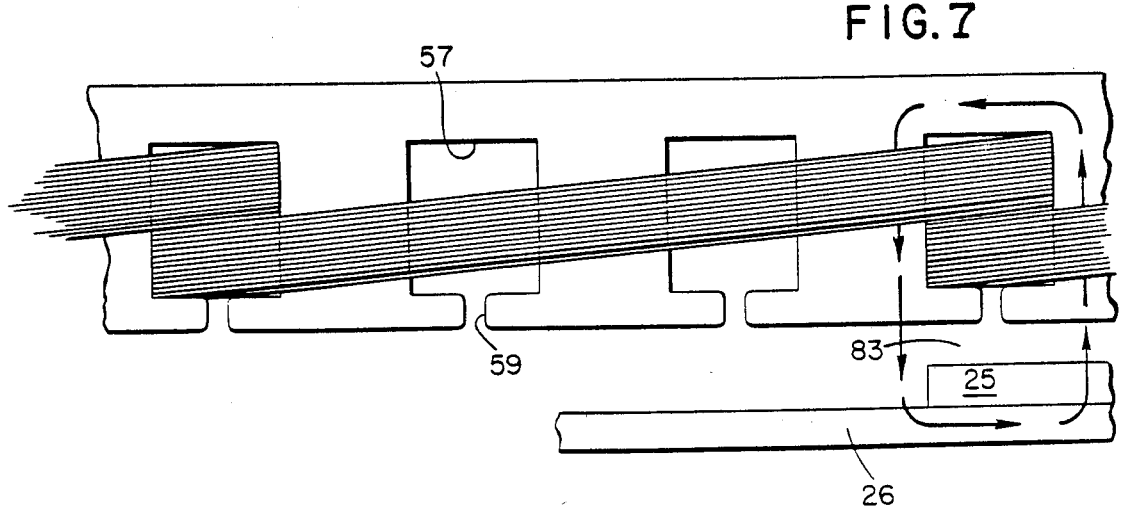
FIG. 7 illustrates in plan view a portion of the stator winding shown in FIG. 3; and, FIG. 8 illustrates in perspective view a portion of the stator core.

The annular coil array 38 and the windings thereof are more clearly illustrated in FIGS. 6 and 7 which show a portion of the coil array, while a portion of the unwound slotted stator core 35 is shown in FIG. 8. FIG. 6 illustrates a view of the side of annular coil array 38 which faces the magnets provided on disc-shaped rotor 26. The annular coil array has a plurality of coils 37 which are wound in the direction of the annulus through radial slots 57 (FIG. 8) which are equally spaced about annular core 35. For the case of a twelve pole three phase motor, a total of thirty nine slots 57 are provided. As shown in FIGS. 6 and 7, a winding "throw" of 1 to 4 is used which means that each coil 37 is wound through two slots 57 which are separated by two other slots 57. The particular coil winding location and throw will, of course, depend on the number of poles and phases for a given motor.

Core 35 is formed of magnetic flux conducting material and is preferably formed as a layered toroidal winding (FIGS. 6, 8) of a strip of magnetic flux conducting material such as an amorphous alloy commonly termed metallic glass, the latter being also known in the trade as METGLAS® (a product of Allied Corp.). Metallic glass is preferred as the material for the core as it has very low magnetic flux loss and reduced coercivity. Materials which can also be used to form core 35 are silicon iron and nickel iron, among others.

The coils 37 are wound through the radial slots 57 which are provided in core 35, as illustrated in greater detail in FIG. 7. For purpose of simplification, only one coil winding is shown in FIG. 7. The windings of the annular coil array are conventional and correspond to the magnetic poles defined by the magnetic field producing elements, e.g. permanent magnets 25, mounted on the face of rotor 26. Each of the radial slots 57 has a slot opening 59 which exits at the side of the stator assembly shown in FIGS. 6 and 8. The slots 57 and slot openings 59 provided in the core 35 can be produced by stamping or etching of the flux conducting material strip to product identical spaced apertures in the strip prior to winding it to form core 35. To obtain alignment of the apertures during winding of the strip, the strip apertures must have an increasing spacing between them along the length of the strip corresponding to the successive strip layers in core 35. The spacing and shape of the apertures is such that the distance "d" between center lines of adjacent slots 57 in the wound core increases with increasing stator assembly radius, as best shown in FIG. 6.

As illustrated in FIGS. 3 and 7, a small air gap 83 separates the opposing faces of the stator assembly 27 and magnets 25 provided on the disc-shaped rotor 26. The magnetic flux paths between the magnets 25 on the rotor and through the magnetic material of the stator core 35 are illustrated in FIG. 7.

As readily understood by those skilled in the art, the three phase coil windings 37 are appropriately energized by three phase AC electrical signals applied to input wires 34 to produce a magnetic interaction between coils 37 and magnets 25 and a corresponding motor action.

Figure 5B:
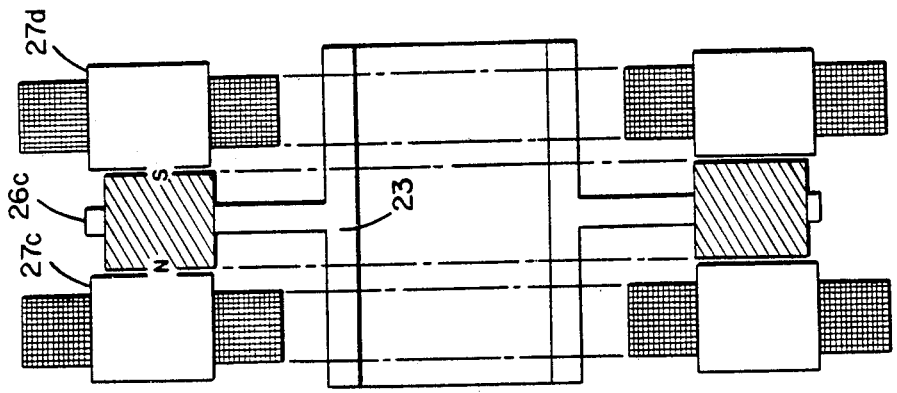
FIGS. 5a and 5b illustrate in schematic form other modifications of the FIG. 1 embodiment.
Figure 5A:
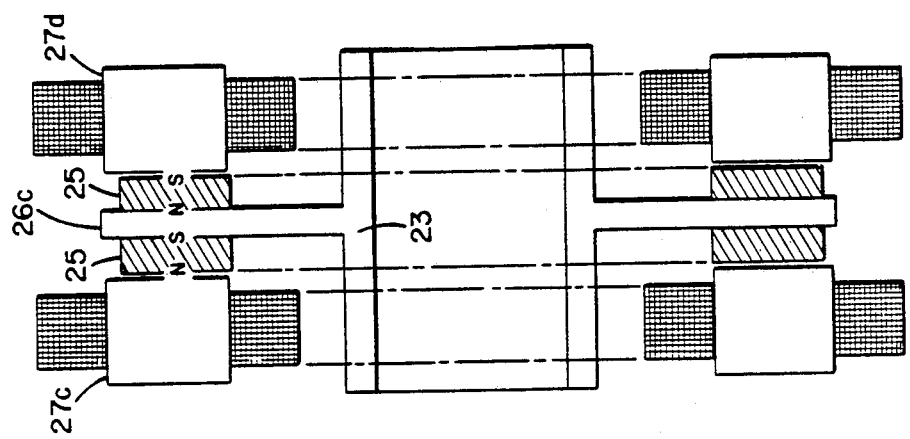
Figure 4:
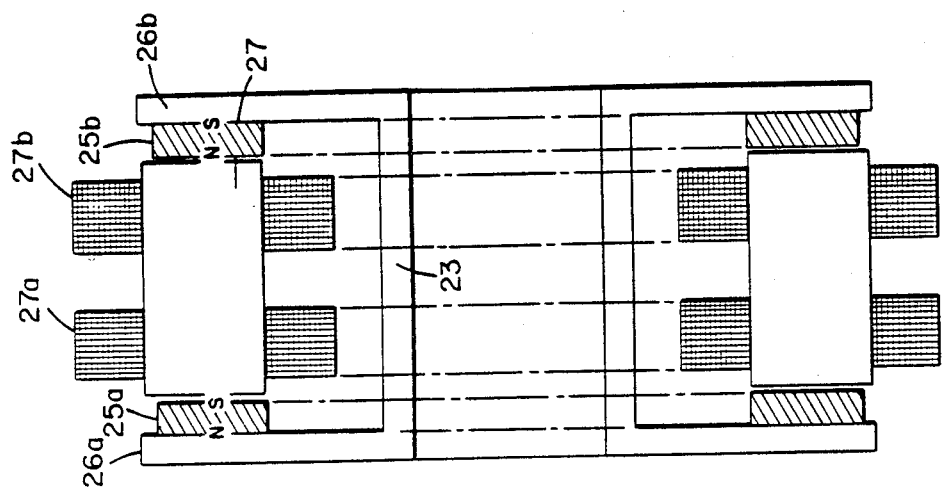
FIG. 4 illustrates in schematic form a modification of the FIG. 1 embodiment.

FIGS. 4, 5a and 5b illustrate in schematic form modifications which may be made to the motor structures illustrated in FIGS. 1-3 and 6-8. In FIG. 4, a stator assembly 27 is provided with two sets of annular coil windings 27a and 27b. Each set is provided on a respective side of stator assembly 27 and each is similar to the stator coil windings illustrated in FIGS. 6 and 7. A pair of interconnected disk shaped rotors 26a and 26b is provided on respective opposite sides of stator assembly 27. Each disk shaped rotor has provided thereon magnetic field producing elements, e.g. permanent magnets 25a and 25b, in the manner illustrated in FIGS. 1-3. The rotors 26a and 26b respectively electromagnetically interact with stator portions 27a and 27b to provide motor action. As illustrated in FIG. 4, the magnets on the rotors 26a, and 26b align axially across stator assembly 27 with the magnet polarities being as indicated in FIG. 4. The two rotors 26a, 26b are shown as having a common hollow shaft 23, but, as with the previous embodiment, the rotor shaft 23 may be solid.

Another modification to the stator/rotor arrangement illustrated in FIGS. 1-3 is illustrated in FIGS. 5a, 5b. In the FIG. 5a embodiment, a single rotor 26c is provided with magnets 25 being provided on opposing surfaces of the rotor. Alternatively, magnets can be provided to project through the rotor 26 as illustrated in FIG. 5b. In the latter two embodiments, a pair of stator assemblies 27c and 27d is provided on opposite sides of the rotor 26c, with each stator assembly having the construction illustrated in FIGS. 6 and 7, but with the side slot opening of each stator assembly respectively facing an opposing side of rotor 26. The magnets of rotor 26c are arranged so that a North pole faces one stator assembly while a South pole, on an opposite side of rotor 26c, faces the other stator assembly. Thus, as in the previous embodiments, the magnets on each side of rotor 26c are arranged to provide alternate North and South poles facing a respective stator assembly.

By providing an axial air-gap motor with a stator assembly comprising a plurality of windings, a motor having a high torque which is capable of dissipating high thermal power is achieved. The use of a metallic glass stator core considerably reduces iron losses typically encountered in conventional motor armature constructions. In addition, by providing the magnetic field producing elements on the rotor, the rotor can retain a relatively light weight disk type shape capable of quickly accelerating and decelerating, thus substantially retaining the desirable acceleration/deceleration characteristics of printed circuit motors.

The motor illustrated is also easy to assemble and disassemble as a result of axially sandwiching the elements shown in FIGS. 1a, 1b within housing 11. This axial sandwiching eliminates any internal slack between parts within the motor interior and provides the motor with a high overall volumetric efficiency as no additional housing space is required for fasteners such as axial bolts to hold the motor together.

Although various embodiments of the invention have been described and illustrated, it should be apparent that many modifications can be made without departing from the spirit and scope of the invention. Accordingly, the foregoing description is to be considered as exemplary of the invention, which is defined solely by the claims which are appended hereto.

What is claimed is:

1. An electromagnetic device comprising:
   a round tubular outer housing having respective annular grooves on an inner peripheral surface at opposite axial ends thereof, each of said grooves having a pair of opposing sidewalls and a bottom wall, one sidewall of at least one said grooves, which is closest to an axial end of said housing, being tapered so that the width of the groove having said tapered sidewall progressively decreases along its depth;
   a stator assembly mounted within said housing;
   a rotor assembly electromagnetically cooperating with said stator assembly and mounted within said housing;
   bearing means for rotatably supporting said rotor assembly within said housing;
   a pair of end bells respectively mounted at opposite axial ends of said housing, each said end bell having an outer circumferential periphery axially extending into a respective end of said housing, the said circumferential outer periphery of each end bell containing an annular groove therein which at least partially opposes a respective groove provided on the inner periphery of said housing, said end bells fixing between them said stator, rotor and bearing assemblies within said housing; and
   a pair of C-clips respectively mounted within and engaging with the opposing grooves at each axial end of said housing, at least that C-clip which is mounted within said groove having said tapered sidewall having a tapered face which is complementary to said tapered sidewall so that said tapered side wall and tapered face engage upon radial expansion of the C-clip having the said tapered face to provide an axial face directed inwardly of said housing to bias said end bells toward one another and hold said stator assembly, rotor assembly and bearing assembly between said end bells.

2. An electromagnetic device as in claim 1 wherein each of the annular grooves provided in said housing has its sidewall closest to the axial end of said housing tapered so that the width of each such groove progressively decreases along its depth, and each said C-clip has a respective tapered face in engagement with a respective tapered groove sidewall such that said end bells are biased toward one another by an axial force directed inward of said housing produced by radial expansion of said C-clips.

3. An electromagnetic device as in claims 1 or 2 wherein said rotor assembly includes a shaft portion and said bearing means comprises a pair of bearings provided at opposite axial end of said shaft portion interposed between an outer periphery of said shaft portion and respective inner peripheral surfaces of said end bells.

4. An electromagnetic device as in claim 3 further comprising a pair of stop means provided on said shaft portion to respectively limit the axial movement of said bearings in an inward direction of said housing, each said end bell containing an inner peripheral surface which presses by means of said axial force a respective bearing against its associated stop means.

5. An electromagnetic device as in claim 4 wherein each said stop means is a shoulder provided on an outer periphery of said shaft portion.

6. An electromagnetic device as in claim 1 or 2 wherein said stator assembly has opposite side surfaces thereof in respective engagement with side surfaces of said end bells so that said stator assembly is held in said housing by said end bells which are biassed toward each other by said axial force.

7. an electromagnetic device as in claim 3 wherein said stator assembly has opposite side surfaces thereof in respective engagement with side surfaces of said end bells so the said stator assembly is held in said housing by said end bells which are biassed toward each other by said axial force.

8. An electromagnetic device as in claim 4 wherein said stator assembly has opposite side surfaces thereof in respective engagement with side surfaces of said end bells so the said stator assembly is held in said housing by said end bells which are biased toward each other by said axial force.

* * * * *